United States Patent
Knowles et al.

[15] 3,679,298
[45] July 25, 1972

[54] CASSETTE-TYPE MICROFILM READER

[72] Inventors: Frederick G. Knowles; Clarence R. Taylor, both of Rochester, N.Y.

[73] Assignee: Eastman Kodak Company, Rochester, N.Y.

[22] Filed: Feb. 3, 1970

[21] Appl. No.: 8,266

[52] U.S. Cl. .................................. 353/26, 352/72, 353/95
[51] Int. Cl. ............................... G03b 23/12, G03b 1/48
[58] Field of Search ............... 353/26, 11, 12, 15, 19, 68, 353/95; 352/72, 74, 78; 274/4 E

[56] References Cited

UNITED STATES PATENTS

| | | | |
|---|---|---|---|
| 2,951,914 | 9/1960 | Dubois.................................. | 274/4 C |
| 3,523,657 | 8/1970 | Hearon et al........................ | 352/78 R |
| 2,280,750 | 4/1942 | Emerson............................... | 353/26 |
| 3,550,879 | 12/1970 | Bundschuh et al. ................. | 352/72 |
| 2,944,825 | 7/1960 | MacSinger .......................... | 274/4 B |

Primary Examiner—Leonard Forman
Assistant Examiner—Steven L. Stephan
Attorney—Robert W. Hampton and R. Lewis Cable

[57] ABSTRACT

Apparatus for projecting images from an information bearing medium such as filmstrip extending between supply and takeup members in a cassette. The apparatus includes a carriage assembly for receiving the cassette in a first position and for moving the cassette to a second position in which the filmstrip is aligned for projection and in which a two-way drive mechanism is engaged to the cassette supply and take-up members. Also, during movement to the second position, a focusing control mounted on the carriage assembly is coupled with a projection lens focusing device in the reader projection system. The projection apparatus further includes a relatively stationary film gate for supporting the filmstrip in a predetermined projection plane, and the cassette containing the filmstrip is adapted to envelop the film gate as the cassette is inserted into the projection apparatus by the carriage assembly.

13 Claims, 7 Drawing Figures

PATENTED JUL 25 1972 3,679,298

FREDERICK G. KNOWLES
CLARENCE R. TAYLOR
INVENTORS

BY

ATTORNEYS

FREDERICK G. KNOWLES
CLARENCE R. TAYLOR
INVENTORS

ATTORNEYS

FIG. 4

FREDERICK G. KNOWLES
CLARENCE R. TAYLOR
INVENTORS

BY R. Lewis Gable

Robert W. Hampton
ATTORNEYS

FREDERICK G. KNOWLES
CLARENCE R. TAYLOR
INVENTORS

ATTORNEYS

CASSETTE-TYPE MICROFILM READER

CROSS-REFERENCE TO RELATED APPLICATIONS

Reference is made to commonly assigned copending U.S. application Ser. No. 8,309, entitled SELECTIVE SCANNING CONTROL FOR PROJECTION APPARATUS, filed Feb. 3, 1970 in the names of Frederick G. Knowles and Clarence R. Taylor; and to commonly assigned copending U.S. application Ser. No. 8,267, entitled APPARATUS FOR STORING STRIP MATERIAL filed Feb. 3, 1970 in the names of Frederick G. Knowles and Clarence R. Taylor.

BACKGROUND OF THE INVENTION

1. Field of the Invention

This invention relates to apparatus for projecting images onto a surface, and more particularly to projection apparatus for receiving a cassette and for projecting images onto a display surface from information bearing strip disposed within the cassette.

2. Description of the Prior Art

Projection apparatus or microfilm readers of the type adapted to receive roll microfilm in cassettes are well known in the art. Readers of this type usually employ drive mechanisms ranging from the extremely complex to the relatively simple for advancing or rewinding film contained within the cassette. Generally, the drive mechanism is mounted either within the main housing of the reader, thereby necessitating a large cabinet so that the mechanism will not interfere with the light path of the projection system, or within a smaller structure attached to the main housing. In either case, the result is a rather large and bulky microfilm reader.

In addition, many readers of this type utilize microfilm cassettes of the type having a film gate integral with the structure of the cassette itself or contained therein. Since greater precision is required in manufacturing a cassette of this type rather than one without a film gate, the manufacturing costs are higher. A cassette of this type must also be accurately supported with respect to the reader so that the portion of film in the cassette film gate will be maintained in the projection plane of the reader. This requirement has necessitated some rather complex cassette positioning structure in microfilm readers, thereby further impeding the development of smaller, more compact readers.

As a result of the above described problems, prior art readers are fairly expensive and usually occupy more or less permanent positions in offices and other locations, requiring personnel to go to the machine in order to utilize it. With the increasing use of roll-type microfilm in business and industry, there is a need for a small, compact, lightweight, and relatively inexpensive cassette-type microfilm reader which is suitable for desk-top operation, i.e., one that occupies a minimum of desk or table-top space, is convenient to handle, and is easily moved from one location to another.

SUMMARY OF THE INVENTION

Accordingly, it is a principal object of this invention to reduce the size and weight of microfilm projection apparatus.

It is another object of this invention to provide a small, compact, and lightweight projection apparatus for receiving and utilizing roll-type microfilm in cassette form.

A further object of this invention is to facilitate the insertion and removal of a microfilm cassette into and out of a microfilm reader.

A still further object of this invention is to provide an economical roll-type microfilm cassette having means for receiving a reader-mounted film gate.

In accordance with the teachings of this invention, a projection apparatus is provided for projecting images from an information bearing strip extending between a supply member and a takeup member in a cassette. Means are provided for inserting and supporting the cassette in the projection apparatus and for engaging drive means with the cassette supply and takeup members to facilitate driving the information bearing strip in either of two opposite directions in a projection plane past projecting means.

In an illustrative embodiment of the invention, a projection apparatus such as a microfilm reader is disclosed which includes means, in this case a slidably mounted carriage assembly, for receiving and supporting a cassette and for inserting the cassette into the reader in operative relation with the projecting means within the reader. A drive mechanism is caused to operatively engage the cassette as it is moved into such operative position. The microfilm reader also includes means for maintaining an information bearing medium such as filmstrip in a projection plane. In this embodiment such maintaining means takes the form of a film gate comprising a pair of transparent members constructed and located to be encompassed by a cassette as the cassette is moved into an operative position, the cassette having an opening into which the transparent members can extend. The microfilm reader further incorporates means for focusing the projection system, such focusing means taking the form of a projection lens slidably mounted within a cylindrical housing, and means for operating the focusing means, such operating means taking the form of an operating shaft which is detachably coupled with the projection lens concurrently with the insertion of the cassette into the reader.

The invention, and its objects and advantages, will become more apparent in the detailed description of the preferred embodiment presented below in conjunction with the accompanying drawings.

DESCRIPTION OF THE PREFERRED EMBODIMENT

Figure 1:
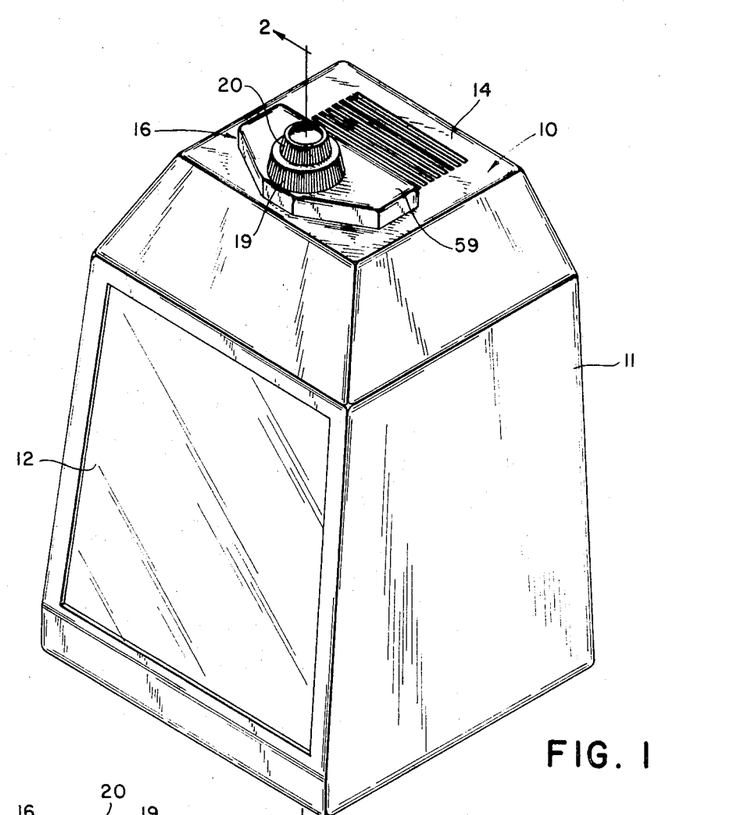
FIG. 1 is a perspective view of a projection apparatus for projecting images from filmstrip stored in a cassette in accordance with the teachings of this invention.
Figure 2:
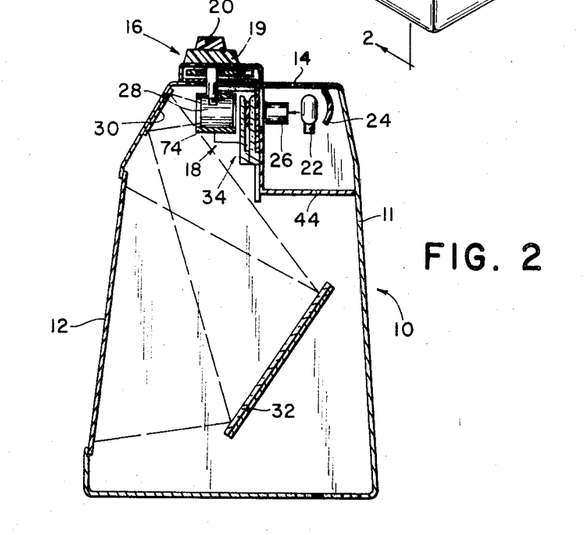
FIG. 2 is a cross-sectional, elevational view of the projection apparatus depicted in FIG. 1.
Figure 6:
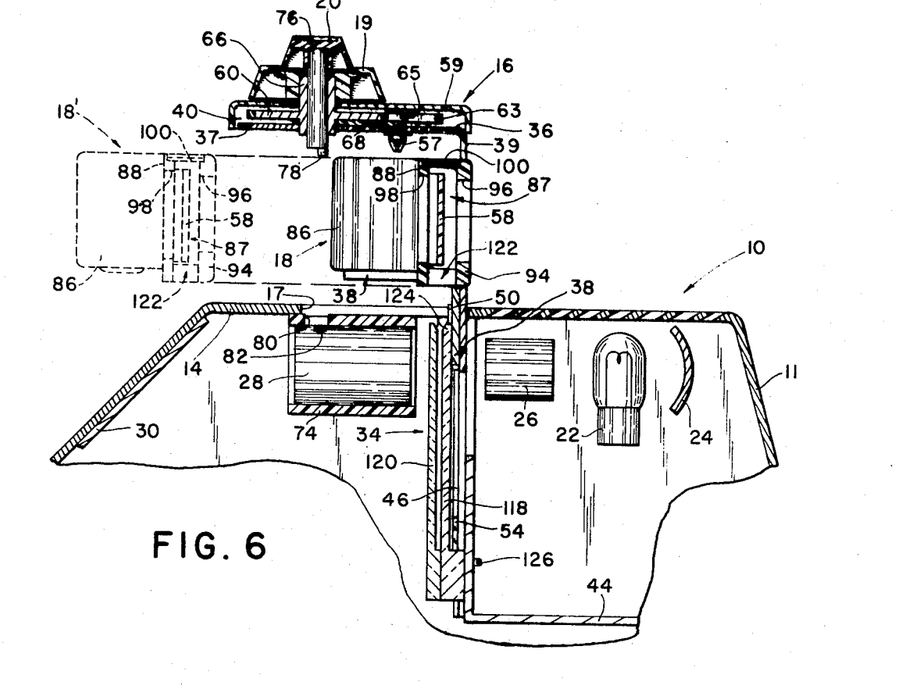
FIG. 6 is an enlarged, partially cross-sectional elevational view showing the cassette carriage assembly in open or raised position and supporting a cassette.

Referring now to the drawings and in particular to FIGS. 1 and 2 there is shown a small and compact projection apparatus or microfilm reader 10 having a housing 11, the front wall of which is formed by a viewing screen 12. The top portion 14 of housing 11 is adapted to receive a cassette supporting means or carriage assembly 16 in a manner to be subsequently described. Carriage assembly 16 is capable of movement between two positions, an open or raised position for receiving a film cassette 18, and a closed position. Movement from the open position to the closed position is effective to insert the film cassette 18 into microfilm reader 10 in alignment with the projection system of the reader. Cassette 18 is inserted into reader 10 through opening 17 in top portion 14 as shown in FIG. 6. Mounted on top of carriage assembly 16 is a film positioning control knob 19 for driving a filmstrip contained in the cassette in either of two opposite directions, and a focusing control knob 20 for focusing the images projected onto viewing screen 12 by the projection system of the reader.

FIG. 2 illustrates schematically the location of carriage assembly 16 in relation to the projection system of reader 10, which system includes a folded light path from the light source to viewing screen 12. Any suitable projecting means known in the art may be used, and in this embodiment there is shown a light source or projection lamp 22, a reflector 24, a condenser lens 26, and a projection lens 28. Light projected through projection lens 28 will travel along the folded light path by the way of mirrors 30 and 32 to viewing screen 12. Means are shown in FIG. 2 for maintaining film in the projecting plane of reader 10, such means or film gate indicated generally by reference numeral 34 and located between condenser lens 26 and projection lens 28.

Figure 3:
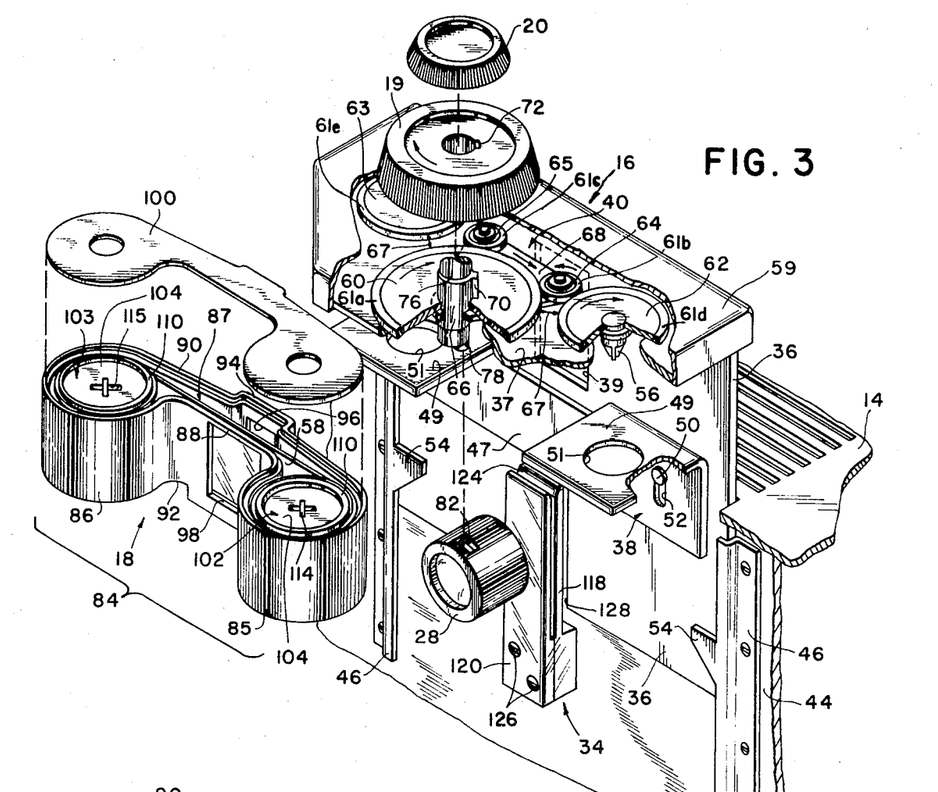
FIG. 3 is an enlarged, partially exploded, pictorial view of the cassette carriage assembly in open or raised position, partially broken away.

Referring now to FIG. 3, carriage assembly 16 is shown in more detail and includes a base plate 36, a bracket member 38, and a drive mechanism indicated generally by reference numeral 40. Base plate 36 includes a top extension plate 37 perpendicular to the main portion of base plate 36 and a central aperture 39 which is aligned with the projection system when carriage assembly 16 is in its closed position within reader 10. In order to facilitate the vertical movement of carriage assembly 16 between an open or raised position and a closed position as hereinabove described, base plate 36 is movably mounted on interior wall 44. Although the mounting of base plate 36 may be in any manner known to those skilled in the art, in the present embodiment base plate 36 is slidably supported, secured by a pair of retainer guides 46 which are fixedly attached to wall 44 in a vertical orientation.

Figure 4:
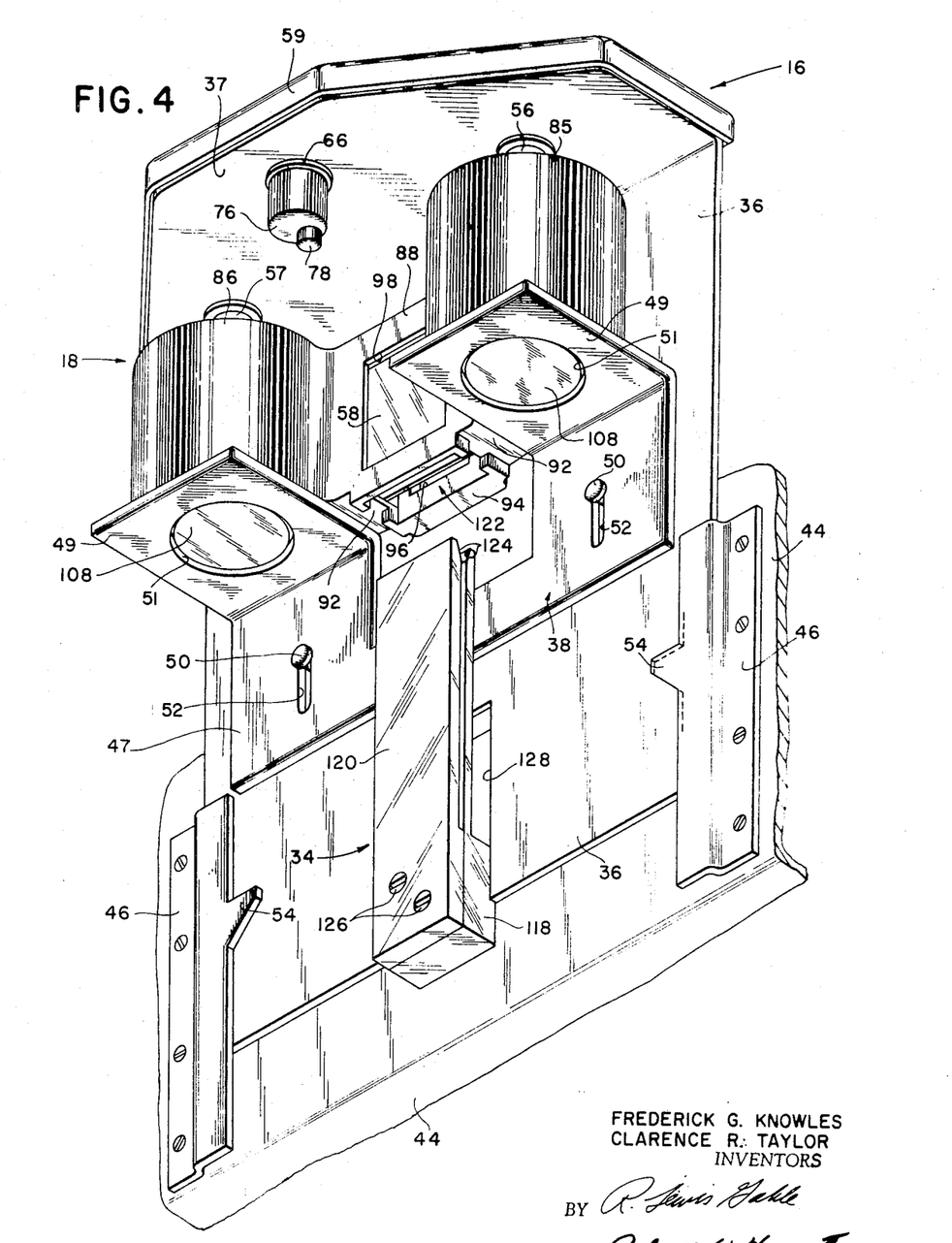
FIG. 4 is an enlarged perspective view, taken from below, of the cassette carriage assembly in a raised position.
Figure 5:
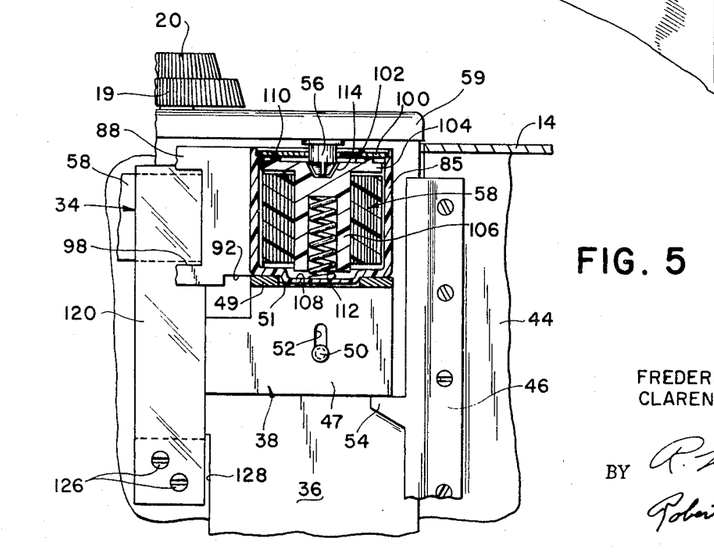
FIG. 5 is a partially sectional, elevational view of the cassette carriage assembly in closed position and showing a sectioned typical film chamber of the cassette.

Cassette 18 is supported in carriage assembly 16 by a bracket member 38 which is mounted on base plate 36 in a manner providing relative movement between bracket 38 and base plate 36. Although bracket 38 may take any suitable form, in this embodiment as can best be seen in FIG. 4, bracket 38 includes a vertically oriented U-shaped plate 47 with a pair of perpendicular extensions 49 disposed at the upper extremities thereof. Each extension has a centrally located aperture 51 for registering film cassette 18 supported thereby. FIG. 4 shows carriage assembly 16 in the open or raised position with film cassette 18 resting on bracket 38, the bracket being mounted on base plate 36 by a pair of pins 50 which are fixedly attached to base plate 36 and extend through slots 52 in plate 47. The widths of slots 52 are slightly larger than the diameters of pins 50 to allow bracket 38 to move freely on pins 50 such that when carriage assembly 16 is moved to the open or raised position, bracket 38 rests on pins 50 at the top of slots 52. When carriage assembly 16 is moved to its closed position within reader 10, bracket 38 encounters an obstruction or obstructions within the reader thereby causing bracket 38 to move upward relative to base plate 36, sliding along pins 50. Such obstructions within reader 10 may take any form; however, in this embodiment the obstructions are stops 54 which are projections from retainer guides 46. When bracket 38 is moved in an upward direction relative to base plate 36 as was just described, film cassette 18 supported thereby is caused to engage film drive pin 56, shown in FIG. 3, and film drive pin 57, shown in FIG. 6. A portion of bracket 38 is shown in FIG. 5 in its uppermost position relative to base plate 36 and resting against stop 54 with carriage assembly 16 in its fully closed position, drive pin 56 being engaged with film cassette 18 in a manner to be subsequently described.

Figure 7:
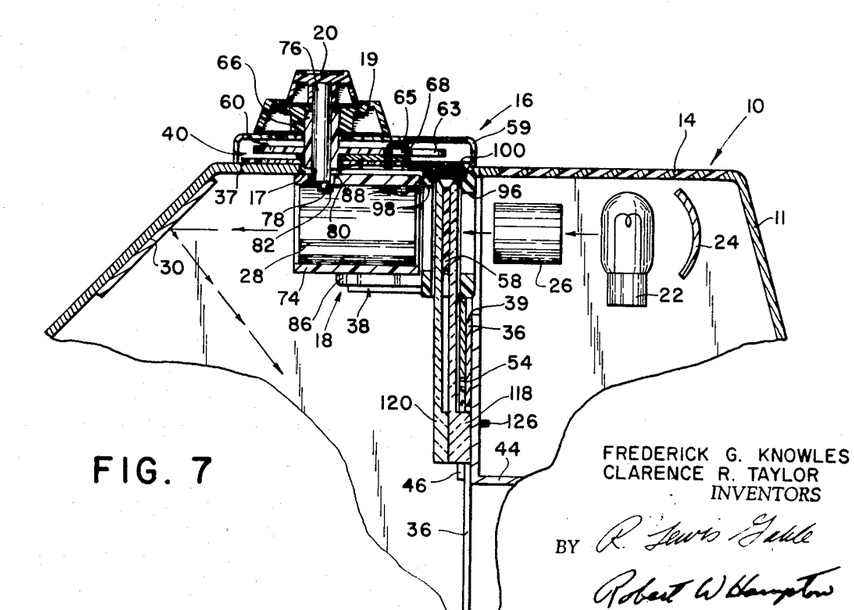
FIG. 7 is an enlarged, partially cross-sectional elevational view as shown in FIG. 6, but showing the cassette carriage assembly in closed position with the cassette inserted into position for projection.

Reference is now made to FIGS. 6 and 7 where the cassette loading operation is more fully illustrated. With carriage assembly 16 in its open or raised position, film cassette 18 is placed on bracket 38 while bracket 38 is in its lowermost position in relation to base plate 36. A cassette 18' is shown in phantom in FIG. 6 to illustrate the proper position for a cassette prior to insertion into carriage assembly 16. After loading, as carriage assembly 16 is lowered into reader 10 to the position shown in FIG. 7, further downward travel of bracket 38 is prevented by contact with stops 54, thereby initiating relative movement between bracket 38 and base plate 36 as base plate 36 continues its downward travel until drive pins 56 and 57 have engaged cassette 18. Film cassette 18 is then positioned in alignment with the projection system of reader 10 and images carried by filmstrip 58 contained within film cassette 18 may be projected onto viewing screen 12.

So that filmstrip 58 contained within film cassette 18 may be driven in either direction for selecting one of a plurality of images recorded thereon, a drive means or drive mechanism 40 is provided. It will be appreciated that any type of compact two-way drive mechanism known to those skilled in the art may be used in carriage assembly 16; however, in the preferred embodiment of the invention as shown in FIGS. 6 and 7, drive mechanism 40 is mounted on extension plate 37 of base plate 36 and enclosed by drive housing 59. As more completely shown in FIG. 3, drive mechanism 40 includes A main drive member 60, a pair of secondary drive members 62 and 63, and a pair of idler members 64 and 65. The main drive member is a flat roller 60 with friction surface 61a and is fixedly mounted on a main drive shaft 66 which is rotatably journalled through extension plate 37. Rotatably mounted about shaft 66 is an idler assembly which includes a triangularly shaped support member 68 on which are mounted idler members or flat rollers 64 and 65 with respective friction surfaces 61b and 61c in continual bearing contact with friction surface 61a of main drive roller 60. Secondary drive members or flat rollers 62 and 63 with respective friction surfaces 61d and 61e are fixedly attached to drive pins 56 and 57, respectively, which are journalled through extension plate 37. As illustrated in FIG. 3, there are spaces 67 between secondary drive rollers 62 and 63 and main drive roller 60. The diameters of idler rollers 64 and 65 must be greater than distances 67 in order for drive mechanism 40 to operate properly. It is understood that gears or other rotatable members may be used in lieu of rollers without departing from the scope of this invention.

In operation, drive mechanism 40 is a two-way drive mechanism in that only one of rollers 62 or 63, is rotatably driven at one time and in opposite directions to one another, thereby facilitating movement of filmstrip 58 in either direction. When main drive roller 60 is rotated in one direction, for example in the clockwise direction as depicted in FIG. 3, idler rollers 64 and 65 are rotated in a counterclockwise direction and consequently support member 68 is rotated clockwise about main drive shaft 66 by virtue of idler rollers 64 and 65 bearing against main drive roller 60 and support member 68 pivoting about shaft 66. As was previously mentioned, the diameter of idler roller 64 is greater than distance 67 between rollers 60 and 62, thereby preventing idler roller 64 from passing between rollers 60 and 62. Therefore, when idler roller 64 contacts secondary drive roller 62, any further rotation of support member 68 the rotation of about main drive shaft 66 is prevented. As illustrated in FIG. 3, idler roller 64 then begins to rotate about its own axis in a counterclockwise direction under the influence of main drive roller 60, drives secondary drive roller 62 and drive pin 56 in a clockwise direction. Similarly, when main drive roller 60 is rotated in the opposite or counterclockwise direction, the same sequence of events takes place, except in reverse. Idler rollers 64 and 65 will be driven in a clockwise direction and support member 68 will be rotated about main drive shaft 66 in a counterclockwise direction until idler roller 65 comes into contact with secondary drive roller 63. Idler roller 65 will then drive secondary drive roller 63 and drive pin 57 in a counterclockwise direction.

Although any suitable motive power may be used to rotate main drive shaft 66, in the preferred embodiment it is operated by film positioning control knob 19. Control knob 19 is attached to main drive shaft 66 by a projection or key 70 extending therefrom and a corresponding slot or keyway 72 in control knob 19 as may best be seen in FIG. 3. When a loaded film cassette 18 is properly inserted into reader 10, filmstrip 58 disposed therein may be driven in either of opposite directions by manually rotating control knob 19 in the desired direction.

During operation, images projected on viewing screen 12 can be brought into focus thereon by translational movement of projection lens 28 along its optical axis. Projection lens 28 is slidably mounted within cylindrical housing 74 to enable such translational movement, which movement is produced by an operating shaft 76 coaxially mounted within main drive shaft 66 so as to rotate independently thereof as shown in FIGS. 3 and 6. On the lower end of operating shaft 76 is an eccentric projection 78. In operation, when carriage assembly 16 is lowered into its closed position in relation to microfilm reader 10, projection 78 and the corresponding lower end of operating shaft 76 pass through opening 17 and through an opening 80 in cylindrical housing 74, projection 78 extending further into slot 82 in projection lens 28 as best shown in FIG. 7. Translation of projection lens 28 within housing 74 is thereby effected by rotating operating shaft 76.

Although operating shaft 76 may be controlled in any convenient manner, in the disclosed embodiment focusing control knob 20 is affixed to the upper end of shaft 76. Control knob 20 enables shaft 76 to be controlled manually. The above described focus means and focus operating means are effective to produce, during operation of reader 10, a sharp in-focus image on viewing screen 12.

Any one of a number of different types of microfilm cassettes can be adapted for use with the microfilm reader disclosed herein. Therefore, it is understood that the disclosed microfilm reader 10 is not limited to use with the hereafter described film cassette 18 or with the cassette disclosed in the above referenced copending U.S. Ser. No. 8,267 application, entitled APPARATUS FOR STORING STRIP MATERIAL. Preferably, a microfilm cassette of the type having no film gate incorporated therein is to be used with this type of microfilm reader, thereby allowing for simpler, more economical cassette construction and also allowing the film gate elements to be included as part of the microfilm reader structure itself, or affixed thereto. Such a reader-mounted film gate provides for more accurate focusing of projected images because the film gate is fixed with relation to the projection lens.

A film cassette 18 for use with the disclosed microfilm reader 10 is illustrated in FIGS. 3, 4, and 5. Cassette 18 includes a housing or shell 84 in the form of two cylindrical cavities or film chambers 85 and 86 which are closed on one end and open on the other end and are connected by a film passageway 87 disposed therebetween. Passageway 87 is formed by two walls 88 and 90 and a bottom edge member 92 (FIG. 4) and is open along its top edge as illustrated in FIG. 3. Wall 90 is disposed generally tangential to the outer surface of film chambers 85 and 86, and is spaced substantially parallel from wall 88. Wall 94 is formed in the middle of wall 90 and is spaced from wall 88 a greater distance than wall 90. Wall 94 has a projection aperture 96 (FIG. 4) aligned with projection aperture 98 in wall 88, which apertures 96 and 98 in conjunction with passageway 87 act to frame for projection an image carried by filmstrip 58. Cassette 18 further includes a cover plate 100 for closing the open ends of film chambers 85 and 86 and the open edge of passageway 87 after loading.

Film cassette 18 also includes a pair of supply and takeup members or spools 102 and 103 for insertion into film chambers 85 and 86, respectively. Spool 102 is shown in FIG. 5 loaded in film chamber 85 and includes a flange 104 disposed at one end only of a partially hollow central core 106. The opposite end of core 106 is loosely seated in depression 108 in the closed end of film chamber 85. On the exterior face of flange 104 is located a raised annular bearing surface 110. A spring 112 positioned in the hollow of core 106 gently urges annular bearing surface 110 against cover plate 100 thereby producing a light friction drag on spool 102. The construction of spool 103 is identical to that of spool 102.

Filmstrip 58 may be attached to spools 102 and 103 in a manner as described in the above referenced copending U.S. application Ser. No. 8,267 entitled APPARATUS FOR STORING STRIP MATERIAL, or in any other well known manner. After winding filmstrip 58 about either or both spools 102 and 103, the spool and filmstrip combination can then be inserted into shell 84 by inserting spools 102 and 103 into the open ends of film chambers 85 and 86, respectively, with that portion of filmstrip 58 extending between the spools being inserted into passageway 87 through the open top edge thereof. Shell 84 is then closed by installing cover plate 100.

As shown in FIG. 3, a pair of drive sockets 114 and 115 are concentrically located in the exterior face of each of flanges 104. Sockets 114 and 115 are shaped for receiving drive pins 56 and 57, respectively, in a coupling manner to impart rotational movement to spools 102 and 103, respectively. As oriented in FIG. 3, rotation of spool 102 in a clockwise direction will advance filmstrip 58 onto spool 102 while rotation of spool 103 in a counterclockwise direction will advance filmstrip 58 onto spool 103. The light friction drag produced by each of surfaces 110 of spools 102 and 103 bearing against cover plate 100 keeps filmstrip 58 taut in passageway 87. It can be seen that cassette 18 may be removed from reader 10 at any time in the projection cycle; there is no need to rewind filmstrip 58 onto either spool 102 or 103.

So that the portion of filmstrip 58 which is disposed within film passageway 87 is maintained within the projection plane of microfilm reader 10, a reader mounted film gate 34 is provided in the disclosed embodiment. Film gate 34 comprises a pair of transparent members or flats 118 and 120 rigidly mounted within microfilm reader 10 so that their uppermost portions are in alignment with the projection system of reader 10 as shown in FIG. 7. Flats 118 and 120 are spaced apart a sufficient distance to allow the insertion of standard thickness filmstrip therebetween; yet, they are spaced close enough to adequately maintain the film substantially within the projection plane defined by flats 118 and 120. To facilitate the insertion of a portion of filmstrip 58 between flats 118 and 120, the bottom edge member 92 of cassette 18 has an opening 122 centrally located between walls 88 and 94. Film gate opening 122 is sized to admit the entrance of flats 118 and 120 into film cassette 18 as cassette 18 is lowered into microfilm reader 10. As best illustrated in FIGS. 6 and 7, when film cassette 18 is inserted into microfilm reader 10 by the operation of carriage assembly 16, film gate opening 122 allows flats 118 and 120 to extend into passageway 87 so as to slidably assemble over and entrap filmstrip 58 contained therein, thereby maintaining it in the projection plane of reader 10. Flats 118 and 120 can have rounded or tapered ends 124 to facilitate the insertion of filmstrip 58 therebetween.

Flats 118 and 120 are rigidly attached to interior wall 44 in microfilm reader 10 in any well known manner such as by screws 126. As illustrated in FIG. 4, there is a slot 128 in base plate 36 to allow base plate 36 to be moved into microfilm reader 10 without interfering with flats 118 and 120. With such a rigid film gate 34, greater accuracy is achieved in maintaining filmstrip 58 within the projection plane of microfilm reader 10 thereby minimizing focusing problems such as caused by film buckling due to heat generated by projection lamp 22. Such a configuration also allows for much simpler construction of the cassette 18 itself since passageway 87 need not include a film gate. Shell 84 of cassette 18 is designed so as to facilitate its production by well known plastic molding processes; however, it is understood that film cassette 18 may be fabricated in any suitable manner known to those skilled in the art.

The invention has been described in detail with particular reference to a preferred embodiment thereof, but it will be understood that variations and modifications can be effected within the spirit and scope of the invention.

We claim:

1. In projection apparatus for receiving a cassette having a housing defining two spaced chambers and a passageway extending between and in communication with said chambers, rotatable supply and takeup members respectively disposed in said chambers and a strip of information bearing medium extending between said rotatable members through said passageway, said housing having a projection aperture in communication with said passageway, the combination comprising:

projection means, a gate comprising a pair of spaced members in alignment with said projection means along a projection axis, a movably mounted carriage assembly adapted to receive and support a cassette and to move it into and out of said projection axis, drive means mounted on said carriage assembly for driving the rotatable supply and take up members of said cassette, said carriage assembly being movable between, a first position wherein said cassette may be received by said carriage assembly, and wherein said drive means are operably disengaged from said rotatable members of said cassette;

and a second position wherein said projection aperture in said cassette housing are in alignment with said projection axis and said members of said gate envelop said cassette housing in the region of said cassette projection aperture, and wherein said drive means are engaged with said cassette supply and takeup members and are operable to drive said members, and wherein said carriage assembly includes base plate means, said drive means being mounted on said base plate means and further includes bracket means slidably mounted on said base plate means and adapted to support said cassette whereby when said carriage assembly is in the first position said bracket means are in a third position relative to said base plate means wherein said bracket means are adapted to receive said cassette and said drive means on said base plate means are disengaged from said rotatable members of said cassette and whereby when said carriage assembly is moved to the second position, said bracket means are moved relative to said base plate means to a fourth position wherein said drive means on said base plate means are drivingly engaged with said rotatable members of said cassette.

2. The combination of claim 1 wherein said members of said gate are transparent at least in the region of said projection axis.

3. The combination of claim 1 wherein said carriage assembly is slidably mounted.

4. The combination of claim 1 wherein said drive means include a drive member rotatable in first and second opposite directions, first and second rotatable driven members, means for operatively coupling said drive member to said first driven member when said drive member is rotated in said first direction, means for operatively coupling said drive member to said second driven member when said drive member is rotated in said second direction, said first and said second driven members each having portions which respectively operatively engage said supply and said take up members of said cassette when said carriage assembly is moved to said second position.

5. In projection apparatus for receiving a cassette having a housing defining two spaced chambers and a passageway extending between and in communication with said chambers, rotatable supply and takeup members respectively disposed in said chambers and a strip of information bearing medium extending between said rotatable members through said passageway, the combination comprising:

focusable projection means disposed along a projection axis, a movably mounted carriage assembly adapted to receive and support a cassette and to move it into and out of said projection axis, drive means mounted on said carriage assembly for driving the rotatable supply and takeup member of said cassette, means for focusing said focusable projection means, said focusing means being mounted on said carriage assembly, said carriage assembly being movable between:

a first position wherein said cassette may be received by said carriage assembly, wherein said drive means are operably disengaged from said rotatable members of said cassette and wherein said focusing means are operably disengaged from said focusable projection means and, a second position wherein said drive means are engaged with said cassette supply and takeup members and are operable to drive said members and wherein said focusing means are engaged with said focusable projection means and are operable to focus said projection means.

6. The combination of claim 5 wherein said focusable projection means include a projection lens slidably mounted within a cylindrical housing and wherein said focusing means include a member mounted on said carriage assembly and detachably engageable with said projection lens to slide said lens within said cylindrical housing to focus said lens.

7. The combination of claim 5 wherein said carriage assembly includes base plate means, said drive means and said focusing means being mounted on said base plates means and further includes bracket means slidably mounted on said base plate means and adapted to support said cassette whereby when said carriage assembly is in the first position said bracket means are in a third position relative to said base plate means wherein said bracket means are adapted to receive said cassette and said drive means on said base plate means are disengaged from said rotatable members of said cassette and whereby when said carriage assembly is moved to the second position, said bracket means are moved relative to said base plate means to a fourth position wherein said drive means on said base plate means are drivingly engaged with said rotatable members of said cassette.

8. The combination of claim 5 wherein said drive means include a drive member rotatable in first and second opposite directions, first and second rotatable driven members, means for operatively coupling said drive member to said first driven member when said drive member is rotated in said first direction, means for operatively coupling said drive member to said second driven member when said drive member is rotated in said second direction, said first and said second driven members each having portions which respectively operatively engage said supply and said takeup members of said cassette when said carriage assembly is moved to said second position.

9. In projection apparatus for receiving a cassette having a housing defining two spaced chambers and a passageway extending between and in communication with said chambers, rotatable supply and takeup members respectively disposed in said chambers and a strip of information bearing medium extending between said rotatable members through said passageway, said housing having a projection aperture in communication with said passageway, the combination comprising:

focusable projection means, a gate comprising a pair of spaced members in alignment with said projection means along a projection axis, a movably mounted carriage assembly adapted to receive and support a cassette and to move it into and out of said projection axis, drive means mounted on said carriage assembly for driving the rotatable supply and takeup member of said cassette, means for focusing said focusable projection means, said focusing means being mounted on said carriage assembly, said carriage assembly being movable between:

a first position wherein said cassette may be received by said carriage assembly, wherein said drive means are operably disengaged from said rotatable members of said cassette and wherein said focusing means are operably disengaged from said focusable projection means, and a second position wherein said projection aperture in said cassette housing is in alignment with said projection axis and said members of said gate envelop said cassette housing in the region of said cassette projection aperture, wherein said drive means are engaged with said cassette supply and takeup members are operable to drive said members and wherein said focusing means are engaged with said focusable projection means and are operable to focus said projection means.

10. The combination of claim 9 wherein said focusable projection means include a projection lens slidably mounted within a cylindrical housing and wherein said focusing means include a member mounted on said carriage assembly and detachably engageable with said projection lens to slide said lens within said cylindrical housing to focus said lens.

11. The combination of claim 9 wherein said members of said gate are transparent at least in the region of said projection axis.

12. The combination of claim 9 wherein said carriage assembly includes base plate means, said drive means and said focusing means being mounted on said base plates means and further includes bracket means slidably mounted on said base plate means and adapted to support said cassette whereby when said carriage assembly is in the first position said bracket means are in a third position relative to said base plate means wherein said bracket means are adapted to receive said cassette and said drive means on said base plate means are disengaged from said rotatable members of said cassette and whereby when said carriage assembly is moved to the second position, said bracket means are moved relative to said base plate means to a fourth position wherein said drive means on said base plate means are drivingly engaged with said rotatable members of said cassette.

13. The combination of claim 9 wherein said drive means include
- a drive member rotatable in first and second opposite directions,
- first and second rotatable driven members,
- means for operatively coupling said drive member to said first driven member when said drive member is rotated in said first direction,
- drive means for operatively coupling said drive member to said second driven member when said drive member is rotated in said second direction,
- said first and said second driven members each having portions which respectively operatively engage said supply and said take up members of said cassette when said carriage assembly is moved to said second position.

* * * * *

UNITED STATES PATENT OFFICE
CERTIFICATE OF CORRECTION

Patent No. 3,679,298          Dated July 25, 1972

Inventor(s) Frederick G. Knowles and Clarence R. Taylor

It is certified that error appears in the above-identified patent and that said Letters Patent are hereby corrected as shown below:

Column 10, line 15.

"drive means" should read "means"

Signed and sealed this 19th day of December 1972.

(SEAL)
Attest:

EDWARD M. FLETCHER, JR.          ROBERT GOTTSCHALK
Attesting Officer          Commissioner of Patents